NDRO OF SINGLE DOMAIN WALLS IN A MAGNETIC SHEET MEMORY

Filed Sept. 16, 1966 2 Sheets-Sheet 1

INVENTOR
A. H. BOBECK
BY Herbert M. Shapiro
ATTORNEY 3,471,840

NDRO OF SINGLE DOMAIN WALLS IN A MAGNETIC SHEET MEMORY

Andrew H. Bobeck, Chatham, N.J., assignor to Bell Telephone Laboratories, Incorporated, Murray Hill and Berkeley Heights, N.J., a corporation of New York
Filed Sept. 16, 1966, Ser. No. 579,866
Int. Cl. G11b 5/00
U.S. Cl. 340—174 7 Claims

ABSTRACT OF THE DISCLOSURE

Nondestructive readout of single wall domains is permitted by the characteristic of such domains to return to a stable size once contracted. A word-organized memory in which the domains are shuttled between first and second associated positions for detection in this mode is described.

This invention relates to information storage arrangements and, more particularly, to such arrangements employing magnetic media.

Copending application Ser. No. 579,904, filed Sept. 16, 1966, for A. H. Bobeck described a memory arrangement wherein a binary "zero" and a binary "one" are represented in a bit location by the presence of a single wall domain in a first or a second position, respectively. Such a memory employs, conveniently, a material which is characterized by substantially like properties regardless of direction in the plane of a sheet of the material and a preferred magnetization direction substantially normal to the plane of the sheet. The canted antiferromagnet yttrium orthoferrite having its C-axis normal to the plane of the sheet is particularly well suited for such a use. Such a memory employs, alternatively, an anisotropic magnetic film, as also disclosed in that copending application.

Memories employing such materials, as described in the aforementioned application, are operated with a read cycle which is on a destructive or, alternatively, on a destroy-restore basis. As is well known, a nondestructive-read operation is preferred in many instances.

Accordingly, an object of this invention is a new and novel, nondestructive-read (NDRO), magnetic memory.

The invention is based on the realization that the materials in memories of the type described are normally in a stable magnetization condition characterized by positive and negative domains having stable minimum areas which are a function of the material parameters, such as the wall motion threshold, and of the thickness of the magnetic sheet but independent of the boundaries of the sheet. It has been found that when the area of a selected domain in such a sheet is reduced by an appropriate field, that area increases when the field is terminated to return the system to the stable magnetization state. This phenomenon is turned to account herein to provide a means for achieving nondestructive-read operation of such memories. Specifically, the presence or absence of a single wall domain in a second position of a given bit location is determined by providing a field to collapse partially any domain present at that position. If a domain is present, a resulting change in flux generates a pulse in an associated sense conductor. If a domain is absent, substantially no change in flux occurs. Any domain so collapsed returns to its initial size when the interrogate pulse terminates.

Accordingly, a feature of this invention is a sheet of magnetic material, means defining in the sheet bit locations including first and second positions wherein each first position initially includes a single wall domain, means selectively moving single wall domains to corresponding second positions, and means selectively reducing the areas of single wall domains at second positions for sensing the presence of such domains in a nondestructive manner.

The foregoing and further objects and features of this invention will be understood more fully from a consideration of the following detailed description rendered in conjunction with the accompanying drawing, in which:

FIG. 1 shows a linear select memory arrangement 10 in accordance with one aspect of this invention. The memory arrangement comprises a sheet 11 of magnetic material, illustratively yttrium orthoferrite, substantially isotropic in the plane of the sheet and having a preferred magnetization direction substantially normal to the plane of the sheet.

Figure 1:
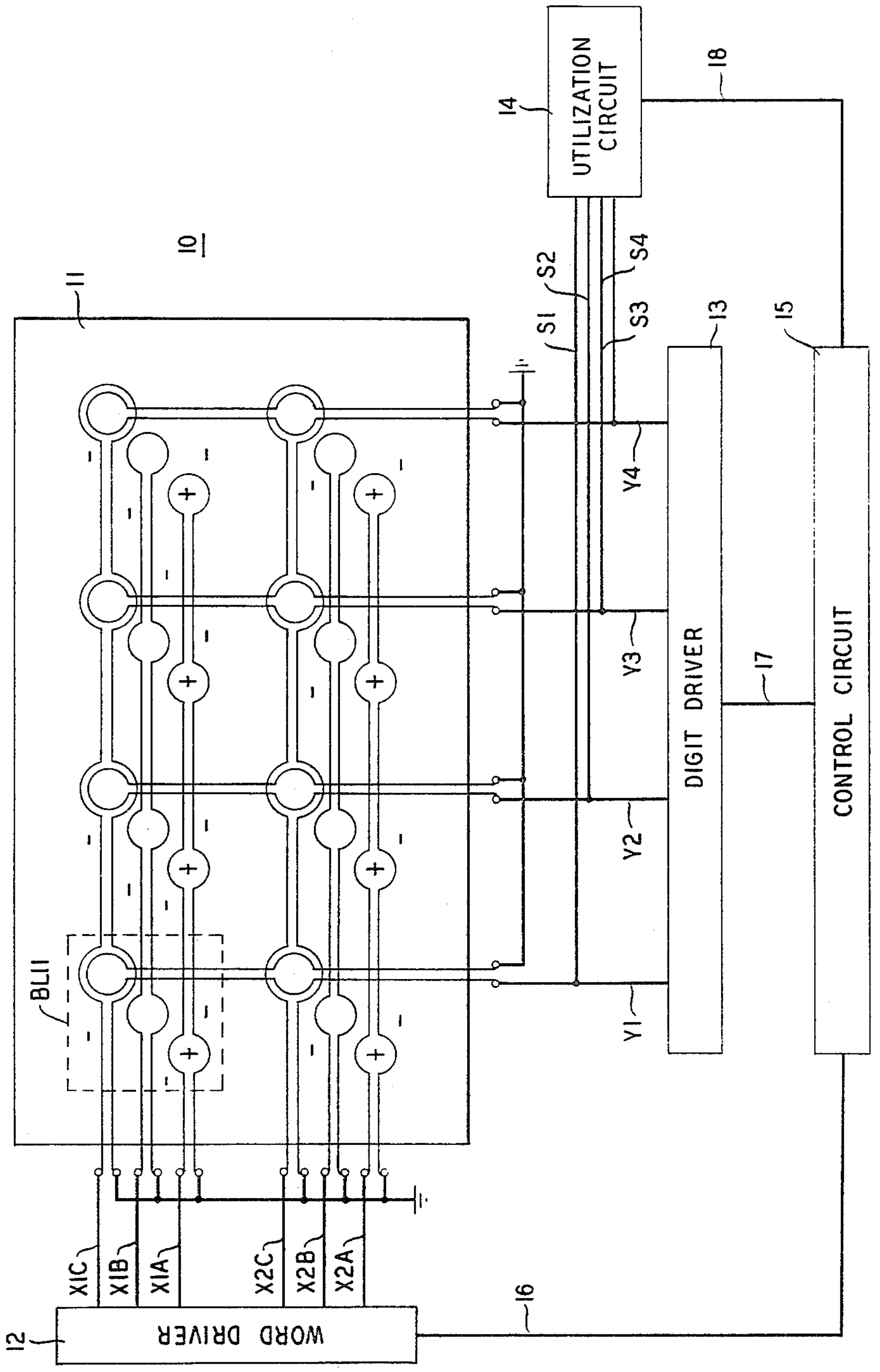
FIG. 1 is a schematic illustration of a memory arrangement in accordance with this invention.

A plurality of propagation conductors couple the magnetic sheet 11 and define there a matrix of multi-position bit locations. Specifically, a plurality of X conductors X1A, X1B, X2A, and X2B arranged, illustratively, along rows intersect a plurality of Y conductors Y1, Y2, Y3, and Y4 arranged along columns as shown in FIG. 1. Each of the X and Y conductors includes a return path to ground and is of a geometry to form conducting loops with corresponding portions of corresponding return paths. The X conductors are organized in pairs designated A and B, a pair of X conductors and a single Y conductor defining a bit location. Each bit location, as may be seen from FIG. 1, comprises a loop in each conductor of corresponding X and Y conductors, the loops being arranged, illustratively, along diagonals. Thus, bit location BL11, defined by the X1 conductor pair and the Y1 conductor, includes three loops, one in each of the defining conductors. The X and Y conductors originate at word and digit drivers 12 and 13 respectively.

Interrogate conductors X1C and X2C, also including return paths to ground, form a series of conducting loops with corresponding portions of corresponding return paths. These conducting loops are positioned to coincide with a loop in each bit location defined by the corresponding Y conductor there. The interrogate drivers are connected to word driver 12.

Sense conductors S1, S2, S3, S4 are connected between correspondingly reference Y conductors and a utilization circuit 14.

Word and digit drivers 12 and 13 and utilization circuit 14 are connected to a control circuit 15 by means of conductors 16, 17, and 18, respectively. The various drivers and circuits may be any such circuits capable of operating in accordance with this invention.

The preparation of a suitable magnetic sheet for the memory arrangement of FIG. 1 is well known in the art. The provision and the disposition of single wall reverse domains in such a sheet are disclosed in copending application Ser. No. 579,995, filed Sept. 16, 1966, for P. C. Michaelis, and in copending application Ser. No. 579,931, filed Sept. 16, 1966 for A. H. Bobeck, U. F. Gianola, R. C. Sherwood, and W. Shockley. An understanding of the means for so disposing the domains initially is not essential for an understanding of this invention. It is merely assumed that each bit location in the arrangement of FIG. 1 includes a single wall domain provided by means disclosed elsewhere.

For the purpose of simplifying the description, we will assume that sheet 11 is magnetized in a direction into the plane of the sheet as viewed in FIG. 1. This magnetization direction is represented by minus signs. The single wall domain, then, is a domain magnetized out of the plane of the sheet as is represented by a plus sign. The domain wall of such a domain illustratively coincides with the corresponding conducting loop. As shown in FIG. 1 each bit location includes a single wall domain in a position corresponding to the conducting loop formed by the corresponding XA conductor and its return path.

Each bit location in the memory arrangement of FIG. 1 includes three conducting loops defined by corresponding conductors XA, XB, and Y. The conducting loop defined by conductor XA normally stores a single wall domain and is designated the first or "zero" position. The conducting loop defined by conductor Y is designated the second or "one" position. The aforementioned copending application of A. H. Bobeck et al. describes the selective movement of single wall domains from a first to a second position in bit locations (word) associated with a particular X conductor pair. The efficacy of the arrangement of FIG. 1 is demonstrated by reading the information in those bit locations in a nondestructive manner.

First the selective movement of single wall domains is summarized before discussing the nondestructive-read operation in accordance with this invention. A single wall domain is encompased by a domain wall which may be thought of as corresponding in position to the conducting loops in the X and Y conductors when the domain occupies a position defined by such a loop. Actually, the domain extends beyond such a loop to a position coupled by the next adjacent loop thus permitting movement of the domains without overlapping adjacent conducting loops. Such movement of single wall domains takes place by pulsing the conductor, including a next adjacent loop in the direction of the desired movement, in a manner to drive flux in that loop in the positive direction.

Figure 2:
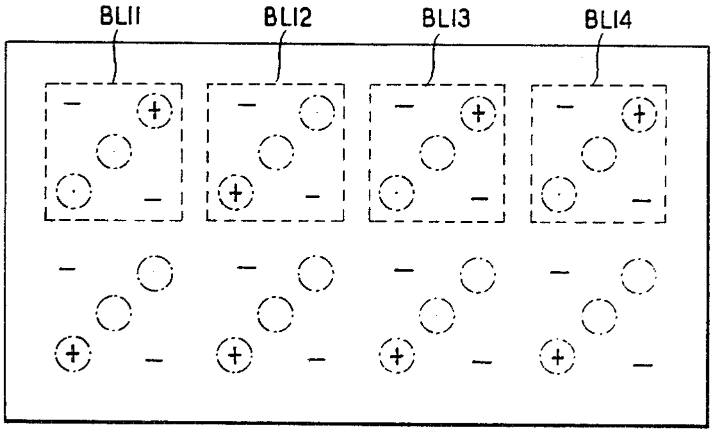
FIGS. 2, 3, and 4 are schematic illustrations of portions of the arrangement of FIG. 1.

Initially, it is assumed that each first (binary "zero") position, defined by loops in the XA conductors, includes a single wall domain. In order to move a single wall domain to the second (binary "one") position in the corresponding bit location first an XB conductor is pulsed and, then, the corresponding Y conductor is pulsed. In the absence of the last-mentioned pulse, the corresponding domain is not moved to the second position. Finally, the XA conductor is pulsed to return disturbed "zeros" to first positions. One may store a representative word in bit locations associated with the X1 conductors, then, by first pulsing conductor X1B by means of word driver 12 under the control of control circuit 15. Thereafter, conductors Y1, Y3, and Y4 are pulsed similarly by means of driver 13. Finally, the X1A conductor is pulsed similarly. Conductor Y2 is not pulsed at this time. The resulting disposition of domains is shown in FIG. 2, a single wall domain being stored in a second position in each of bit locations BL11, BL13, and BL14 while a domain is stored in a first position in bit location BL12.

A nondestructive-read operation in accordance with this invention is carried out by an interrogate pulse on an XC conductor. Such a pulse is of a polarity to collapse domains at positions defined by loops therein but of an amplitude short of that required to collapse the domain completely or to collapse the domain to below a critical area at which further collapse is spontaneous. Such a pulse, when applied to conductor X1C, by means of word driver 12 under the control of control circuit 15, decreases the area of single wall domain in bit locations BL11, BL13, and BL14 (see FIG. 2) assuming the representative word 1011 is stored as described above.

Figure 3:
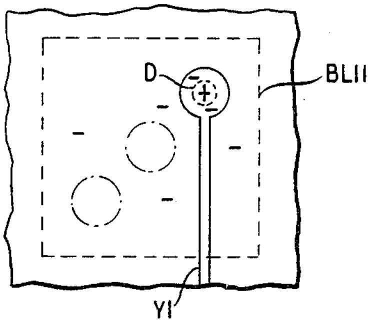

FIG. 3 depicts the domain D of decreased area in bit location BL11. A decrease in area is accompanied by a decrease in the flux coupling corresponding Y conductors inducing pulses in conductors Y1, Y3, and Y4 for detection via conductors S1, S3, and S4, by utilization circuit 14. The second position in bit location BL12 is unoccupied. Therefore, the interrogate pulse tends to initialize the corresponding second position shuttling flux therein. Only a negligible pulse is induced in conductor Y2 for detection. At the termination of the pulse on conductor X1C, the areas of the domains in bit locations BL11, BL13, and BL14 increase to the initial size greater than the conducting loop in conductor Y1 as represented by the domain D in FIG. 4. A nondestructive-read operation is realized.

Figure 4:
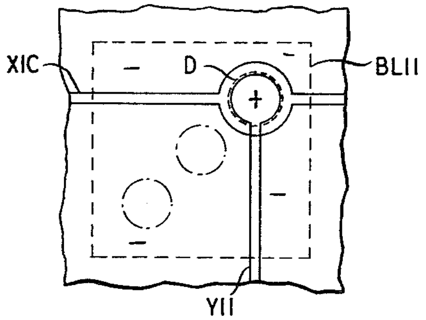

It is to be noted that the interrogate conductor, X1C, includes loops each having a diameter greater than the diameter of the single wall domain as shown in FIG. 4. If the diameter of that loop were smaller than that of the single wall domain, an "interrogate" pulse of the opposite polarity is applied ostensibly to increase the area of the domain interrogated. A partial reduction in area does result from such a pulse, however.

Single wall domains are returned to the first (zero) position in corresponding bit locations by pulsing conductors XB and XA in sequence. For example, the word 1011, stored as described, is removed from memory by pulsing conductors X1B and X1A. Again the operation is consistent with that described in the aforementioned application of A. H. Bobeck.

The memory, of course, may be organized in a random access fashion as described also in the aforementioned application of A. H. Bobeck. A linear select organization was chosen illustratively to demonstrate that a nondestructive-read operation may provide outputs along an interrogate (word) conductor as well as along the digit conductors (as illustrated), a property useful in associative memories. Readout along an interrogate conductor XC is achieved by pulsing the Y conductor to decrease the areas of single wall domains in corresponding second positions thus inducing pulses in the associated XC conductor.

The ouput signal exhibited during a nondestructive-read operation in accordance with this invention is proportional to the change in area of the single wall domain during that operation. For yttrium orthoferrite sheets four mils thick and having a wall motion threshold of two oersteds, a single wall domain has a diameter of about sixteen mils. For comparison, a conducting loop has a diameter of about fifteen mils, adjacent loops being formed on fifteen mil centers. A pulse of about five hundred milliamperes decreases the diameter of a single wall domain to about five mils inducing a pulse of about 1.5 millivolt-microseconds in the digit conductors for detection. The domain is restored to its stable size in about one microsecond after the termination of the interrogate pulse. The collapse of a single wall domain in an environment of opposite magnetization usually requires a relatively large amplitude pulse of about two amperes for the example described.

What has been described is considered only illustrative of the principles of this invention. Accordingly, various and numerous other arrangements may be devised by one skilled in the art without departing from the spirit and scope of this invention.

What is claimed is:

1. In combination, a sheet of magnetic material, means defining in said sheet bit locations each including first and second positions, each of said first positions including a single wall domain having a first area, means moving single wall domains to second positions in selected bit locations, and sense means selectively changing the diameter of domains stored in second positions to a second value from which the domain spontaneously returns to said first value.

2. A combination in accordance with claim 1 wherein said sense means includes means applying a magnetic field to selectively reduce a domain to a second area less than said first area.

3. A combination in accordance with claim 2 wherein said sense means comprises an interrogate conductor coupled to second positions in said sheet in a manner to generate in said second positions a field of a polarity to initialize the magnetization there when pulsed.

4. A combination in accordance with claim 3 wherein said interrogate conductor defines at each of said bit locations a conducting loop having a diameter larger than a single wall domain there.

5. A combination in accordance with claim 4 in which said sheet comprises a material having a preferred magnetization direction out of the plane of the sheet.

6. A combination in accordance with claim 5 wherein said sheet comprises yttrium orthoferrite.

7. In combination, a magnetic medium, means for defining in said medium a single wall domain having a first stable diameter, and means for changing the diameter of said domain from said first to a second diameter from which said domain returns to said first diameter spontaneously.

References Cited

UNITED STATES PATENTS 3,223,985 12/1965 Bittman et al. -------- 340—174

OTHER REFERENCES

Spain, R. J.: Controlled Domain Tip Propagation Part I, Journal of Applied Physics, vol. 37, No. 7, June 1966, pp. 2572–83.

BERNARD KONICK, Primary Examiner

GARY M. HOFFMAN, Assistant Examiner